(12) United States Patent
Samman

(10) Patent No.: US 6,210,702 B1
(45) Date of Patent: Apr. 3, 2001

(54) WEIGHT LOSS COMPOSITION AND METHOD FOR LOSING WEIGHT

(76) Inventor: Ratib Al Samman, P.O. Box 7017, Damascus (SA)

( * ) Notice: Subject to any disclaimer, the term of this patent is extended or adjusted under 35 U.S.C. 154(b) by 0 days.

(21) Appl. No.: 09/394,256

(22) Filed: Sep. 13, 1999

(51) Int. Cl.[7] .................................................. A61K 47/00
(52) U.S. Cl. ............................................................ 424/439
(58) Field of Search ............................................. 424/439

(56) References Cited

U.S. PATENT DOCUMENTS 4,737,364 * 4/1988 Kalogris .............................. 424/195.1

FOREIGN PATENT DOCUMENTS

4302182 * 1/1993 (DE) .
06007099 * 1/1994 (JP) .
06033087 * 2/1994 (JP) .
11009174 * 1/1999 (JP) .
2064265 * 7/1996 (RU) .

* cited by examiner

Primary Examiner—Jose' G. Dees
Assistant Examiner—Alton Pryor

(57) ABSTRACT

This invention relates to a dieting method and novel line of food products. These novel food products replace similar food products and are utilized by the dieting method to induce a slowed carbohydrate absorption rate thereby achieving weight loss. Furthermore, the dieting method will induce a high satiating effect to control eating habits and provide the dieter with additional doses of mono and poly unsaturated fatty acids to prevent any decrease in energy consumption.

6 Claims, No Drawings

WEIGHT LOSS COMPOSITION AND METHOD FOR LOSING WEIGHT

BACKGROUND OF THE INVENTION

1. Field of the Invention

This invention relates generally to a method for achieving weight loss utilizing a novel line of food products that replace existing products. More particularly, the present method of weight reduction allows the dieter to eat certain naturally available food items in open quantity while replacing restricted food items by the novel line of food products described herein.

2. Description of the Prior Art

Various dieting methods are known for the treatment of obesity, diabetes, high cholesterol and high TriGlycerides. It is well known in the medical community that the first step to follow for dieting is to reach the body normal weight. It is also well known that weight reduction in the normal range of body weight prevents the occurrence of most clinical complications of obesity. Furthermore, as clinical symptoms and the general condition of diabetic patients improves through dieting many diabetics become less reliant on diabetic medications.

Weight control and proper diet also help in the treatment of high blood cholesterol. Although high blood fat is a hereditary factor in most instances, proper diet is effective in improving over 80% of high blood cholesterol cases.

Current dieting methods always advise to first start by classical dietary measures. Only when classical dietary measures proves to be ineffective are medicines and drugs needed.

Many overweight patients rely on medicines that are used as appetite suppressants, metabolic rate enhancers, etc. Almost all of these medicines prove to be ineffective in the long term or exhibit side effects such as nervousness, palpitation, insomnia, etc. These side effects limit medicinal use to no more than an encouraging factor to start a diet. Such medicines include, but are not limited to dietary supplement compositions comprising St. Johns Wart (hypericin), Mahuang (Ephedra Sinica or Ephedrine), caffeine and aspirin.

Many patients not satisfied with the current methods of weight loss rely on surgical procedures. These procedures are dangerous and unsuitable for the majority of the overweight population. Athletic exercise has also become widespread in the fight to lose weight, however exercise without proper diet has proven to be ineffective in reducing weight.

Other methods for dieting and weight loss include fad diets (one sort of food item diet), only fruits diet, creams, ear rings, belts, acupuncture, sauna and steam baths, tread mill, drugs and medicines, herbs and classical diet food.

Many of the prior art methods of dieting suffer from unpleasant side effects such as hunger, dizziness, fatigue and cold extremities. Furthermore, prior art methods of dieting deprive the dieter from eating foods such as breads, sweets, pasta, fatty meat products, and delicious fruits.

Present methods of dieting have had very limited success. The following summarizes the reasons for this.
Calorie Reduction Method:
Difficulties in applying it in real practice:
Most people face the problem of calculating the amount of calories needed and caloric expenditure, and the caloric contents of food they take. Even if they were capable of knowing the caloric value for many food items, it is impossible to regulate so as to take the given amount of calories throughout the day. If they manage to do this on some days they will fail on other days because of different social events. Following rigid diet prescriptions will usually result in boredom and the patient returning to his/her old food habits. Because the problem of overweight and dieting is a lifelong problem, this will be only a temporary solution. The dieter will usually lose weight then regain it within the 3–4 weeks after resuming his/her ordinary life routine.

The reduced calorie food: like skim milk, low fat food:
Many of these food products are available in most countries. Although overweight people choose only to buy such products, their problem of overweight is increasing. The reason is that they cannot estimate precisely the amount of such food that is suitable for them. They eat these foods in amounts enough for producing satiety. Because reduced fat foods are less satiating than full fat foods they eat double the quantity of ordinary food, thinking it is safe and devoid of any fattening effect. This results in eating the same amount of calories by eating twice the amount of food.

The problem of tolerance and plateau:
Using low calorie diets for a long period of time (i.e., more that 3–4 weeks) leads to the formation of low gear calorie burning. Human beings reduce their need of calories by several compensation processes, including reducing the tendency to activity, decreasing skin temperature, constipation, secreting less fat burning hormones, etc. This will lead to the reduction of caloric need by 25–40%. This reduction in the body weight itself leads to further decrease in caloric need. The total decrease in caloric need achieved will compensate for the amount of caloric intake reduced. This will result in a halt in body weight loss process known as Plateau. Although the dieter eats no more than 50–60% of his ordinary food, no further weight loss will occur. Usually patients then return back to their old habits of eating and gain back all the weight lost.

The problem of malnutrition:
Most low calorie dieters suffer from the problem of malnutrition during or after their weight loss course. This is because reducing calorie intake by 40–60% is accompanied in most cases by a decrease in the total amount of food taken by the same ratio (i.e., 40–60%). The amount of nutrients taken will be reduced in proportion to this ratio. This means that the dieter will ingest 40–60% less nutrients including protein, essential fatty acids, minerals and vitamins. This long period of very low fat intake will lead to a severe decrease in the absorption of fat soluble vitamins and the formation of free radicals which may be responsible for premature senility and dystrophic changes in the skin and eyes. Free radical formation has also been linked to causing cancer.

The problem of hypercholestrieamia:
Patients suffering from high cholesterol need to eat more unsaturated fatty acids available in vegetable oils. Some are not capable of doing this because of the fear of a dramatic increase in caloric intake. This results in patients having to be treated by more complicated, dangerous, and to a wide extent, less effective methods such as drugs and medicines.

Any medically accepted diet should allow for all kinds of food and nutrients to be consumed. Omitting one food component has very dangerous results both psychological and physical. For example, in an Atkin diet omitting carbohydrate intake means the avoidance of intake of fruits, vegetables and grains. This will lead to lack of fiber, vitamins and minerals, that can cause health problems such as constipation, electrolytes disturbances, and dramatic increases in blood cholesterol. In fad diets (one-item diets) there will be the danger of protein loss and deficiency with very dangerous complications such as hair loss, muscle degeneration, and heart arrest.

SUMMARY OF THE INVENTION

Accordingly, it is an object of the present invention to provide a dieting method that is balanced to include all types of ordinary food items including meats, vegetables, grains, pulses, fruits, dairy products, eggs, fat and oils.

Another object of the invention is to provide a dieting method with no restrictions relating to eating habits, time of food consumption, or eating prescriptions.

Another object of the invention is to provide a dieting method that provides a quantity of food sufficient for satiating, nutritional and satisfying purposes so the dieter can go on dieting until reaching his/her goal weight.

Another object of the invention is to provide a dieting method that allows for free access to high amounts of vegetable oils whereby such oils help in preventing and treating atherosclerosis, high cholesterol and heart disease.

Another object of the invention is to provide a new line of manufactured food items.

A further object of the invention is to provide a dieting method that gradually reduces calorie intake.

In summary, the dieting method described herein depends upon a new line of manufactured food items.

These products should replace similar products manufactured according to old methods. In the dieting method discussed herein, the dieter has free access to all naturally available food items as well as the new line of food items described herein.

The new dieting method allows for no restriction on consumption of the following food items:

1. All kinds of meat (even fatty meat products cooked, roasted or fried with oils).
2. All kinds of vegetables prepared according to any cooking method.
3. All kinds of green or fresh or frozen pulses and grains prepared according to any cooking method. Pulses and grains are not allowed if they are dried and processed by grinding or extracting.
4. All kinds of fruits and fruit juice. The fruit should be fresh and not dried or fermented. The juice should be prepared by using a blender machine. Extracted and refined juice should be avoided.
5. All kinds of dairy products including full creme milk, yogurt and cheese.
6. Eggs prepared according to any cooking methods. There is no need for removing the yolk or restricting the number of eggs eaten. This also applies to high cholesterol dieters.
7. All kinds of oils, fat, ghee, butter, creme margarine mayonnaise and tahina.
8. All dieters suffering from high blood cholesterol should replace fat from animal sources with fat from vegetable sources. This includes replacement by olive, soybean, peanut, and corn oils. This restriction is only applied to high blood cholesterol dieters and is not necessary for dieters suffering from overweight and diabetes problems. Dieters suffering from high cholesterol are encouraged to increase, as far as possible, the intake of olive oil.

The food items that are not allowed that should be replaced by the new line of manufactured foods described herein are as follows:

1. Bread: The bread described herein should replace similar items. The amount of bread to be consumed is open, and determined by the satiety and satisfaction of dieters, but preferred consumption is no less than 1.5–2 loaves of bread per day.
2. Cookies, sweet, patisserie, marmalade, chocolate, and ice cream should not be consumed. The cookies, sweets, patisserie, marmalade, chocolate and ice cream described herein should replace similar items. These products are to be consumed in any amount desired. Consumption of these items is optional while the use of the bread described herein is required for the dieting method disclosed.
3. Pastas, macaronis, and pies should not be consumed. The pasta, macaroni, and pies described herein should replace similar items. These products are to be consumed according to user preference, in any amount desired. Consumption of these items is optional, while the use of the bread described herein is required for the dieting method disclosed.
4. Dried grains are not allowed. Green or frozen pulses and grain should replace them and can be consumed according to user preference. Any method of food preparation is allowed for these items and in cases of unavailability of green or frozen alternatives, dried pulses and grain, such as dried beans and rice, may be consumed. However, such items can not be consumed more than once per week. The amount of dried pulses and grain should be as minimal as possible.
5. Refined sugars should be avoided. Naturally available sweet fruits and vegetables such as carrots and beets should replace them. Soft drinks, tea and coffee, artificial sweeteners and diet beverages can be consumed, but the user should be sure that no sugar under a hidden name is added, such as dextrose, maltodextrin, glucose, corn syrup, starch, etc.

DESCRIPTION OF PREFERRED EMBODIMENT

The following specific examples are intended to illustrate more fully the nature of the present invention without acting as a limitation on its scope.

The new line of manufactured food items replacing restricted food items includes, but is not limited to bread, macaroni and pasta, pies, sweets and cookies, chocolate and ice cream. These products will subsequently be referred to as BioSystem™ products.

The food items described herein have the following characteristics as compared to similar products manufactured by the old ways of production. The weight loss composition described below is characteristic of all food items that are the subject of this invention. For bread, the weight loss composition described below would further include wheat flour, baking yeast, water, minerals and vitamins with minimal chemical preservative contents.

| Weight Loss Composition | Ordinary White Bread and Bran Bread |
|---|---|
| Almost free from mono & disaccharide's (free or digested carbohydrates). | 50% mono & disaccharide's in Bran Bread and 78% mono & disaccharide's in White Bread (free or digested carbohydrates). |
| Complex Carbohydrates ranging between about 8% to about 18% of dry weight of which at least about 90% of said carbohydrates are amylopectin and amylose, up to about 5% of said carbohydrates are disaccharide's and polysaccharides and up to about 5% of said carbohydrates are mono saccharides | 12% complex carbohydrate in Bran Bread and 4% complex carbohydrate in White Bread of dry weight. |
| High vegetable protein contents greater than about 43% of dry weight. The protein is a high biological value protein in that the protein includes essential amino acids very near the quality of animal protein and sufficient to provide the Required Daily Allowance (RDA) of essential amino acids in small protein amounts. The vegetable protein is derived from plants including soy bean, peanut, lupine, wheat, yeast, or equivalents thereof. | 8–12% of dry weight vegetable protein in Bran and White Bread. |
| High content of vegetable fat rich in essential poly unsaturated fatty acids. The fat content ranges from about 14% to about 25% of dry weight of which about 15% of said fat is saturated fat, about 40% to about 45% of said fat is mono unsaturated fat and about 40% to about 45% of said fat is poly unsaturated fat. The mono unsaturated fat includes oleic acid fatty acids or equivalents thereof, and the poly unsaturated fatty acids include linoleic, linolic and arachidonic fatty acids or equivalent thereof. | while ordinary bread doesn't have any content of these beneficial fat, in contrast they may be replaced by butter and milk fat rich in saturated fatty acids. |
| High content dietary fibers with balanced formula between it's different kinds, reaching between about 4.8% to about 6.2% of dry weight. The dietary fibers comprise about 65% or more of water soluble fibers and about 35% or less water insoluble fibers. | 0.9% of dry weight in Bran Bread and 0.2% of dry weight in White Bread of dietary fibers. |
| Very low glycemic index ranging between about 5% to about 15%. | while the glycemic index of White Bread is 95% and Bran Bread is 75–85%. |

A practical example of the dieting method is as follows: This method is applicable to all first time dieters as well as dieters who are more than 30% over weight. This dieting method can also be used in conjunction with other dieting methods that a particular individual may be on.

Breakfast:
  Example (1)
  One loaf of BioSystem™ bread, plus one or more of the following items:
  Cheese of any kind, labanah, olives, Makdouse, Oil and Zaather (Thymus leaves),
    Eggs boiled or fried, Marmalade (of BioSystem™ product only), Halawa Tahina (of BioSystem™ product only).
  Tea sweetened with Aspartame tablets
  Example (2)
  Cake (Biosystem™ product only) or Pies (BioSystem™ product only) plus salad.
    Tea or cafe sweetened with aspartame tablets
  Example (3) once/week only:
  One loaf of BioSystem™ bread
  Broad beans or soy beans or chick peas (dry cooked); made by adding 3 spoonfuls of cooked beans to other component for making a dish of beans salad or check peas with tahina.

Lunch:
  One or two loaves of BioSystem™ bread, and
  Meat ex., roasted cabab, B-B Q or roasted chicken or fried chicken or fish, or hamburger (without flour or starch) or beefsteak etc. or
  Meat cooked with vegetables: ex., Indian Cabab, Jews Mallow with meat, broad beans or squash or zucchini with meat and eggs, Tomato or Okra, kidney beans with tomatoes, Artichoke with minced meat. or
  Vegetables cooked in oil: ex., broad beans in oil, aubergin or cauliflower fried in oil, or
  BioSystem™ pie products (meat, cheese or spinach pie or pizza), and
  Salad: ex., green salad or salad with souse or, yogurt, or yogurt or fattoosh (salad with BioSystem™ bread), or Taboola (salad with parsley and wheat germ). The cabbage may be used as replacement for wheat germ, Motabbal (blended aubergin with tahina), and
  Vegetable Soup: (with meat sauce, if desired). It should be noted that all dried grains like rice, lentils and wheat should not be added.

2–3 Hours After Lunch:
  Any kind of fruit may be consumed, except for bananas and dates. Figs and grapes are preferred to be consumed no more than once/week and the quantity of fruits is open but preferred to be no more than two servings/day. For example: one whole fruit of apple, orange, pear, mandarin, pomegranate, or peaches; or 24 pieces of cherries; or 6 apricots; or 4 plums; or 16 grapes; or 6 figs.

The fruits may be consumed also as fruit juice. The juice should be prepared using a blender and the residue should always be consumed together with the fruit syrup. No sugar should be added, but artificial sweetener like aspartame can be used. One serving of BioSystem™ sweets or cookies can be consumed in the place of a fruit serving. The fruit or sweet may be taken at bedtime or as preferred.

Dinner:

A meal like that of breakfast or lunch may be consumed. It is possible to take a sandwich, hamburger or shawerma but it is essential to use BioSystem™ bread in the place of ordinary bread Bed Time:

Fruit or BioSystem™ sweets may be consumed at bedtime if not taken after lunch.

A small quantity of mixed nuts (no more than 25 grams once or twice per week) may be consumed in the place of fruits or sweets Special Occasions or Parties It is permissible to deviate from the program, taking in consideration the following:

Non-permitted food items like, sweets and pasta should be consumed in small quantities.

Deviation from the program should not be more than once every other week.

The quantity of non-permitted food consumed in such situations should be as small as possible. The amount of allowed food items should also be reduced during that day, so as to be formed of salad and fruits. Meat and fat should be avoided During Trips and in Restaurants:

BioSystem™ bread and sweets should be consumed. B.B.Q., fried chicken, meat, meat soup, vegetables cooked with meat and fat, all kinds of salad and mutabal, breakfast entrees, hamburger and shawerma must be consumed with BioSystem™ bread.

ADVANTAGES AND NEW FEATURES

Recent studies show that different food items differ in their ability to increase blood sugar level, according to the composition and content of free sugars. The ability of certain food to increase blood sugar level, compared to glucose is called the glycemic index. BioSystem™ products have a very low glycemic index.

Clinical nutrition studies have established that eating high glycemic index food items have three main hazards:

1—they contribute to latent diabetes mellitus more ready to manifest clinically, especially if the diabetes is inherited, or obesity is present.

2—They are a factor in increasing the possibility of developing morbid obesity, especially in people with familiar or congenital history.

3—They increase the possibility of higher TriGlyceride and cholesterol levels in the blood. This occurs though several metabolic mechanisms, mainly the conversion of carbohydrates to lipids.

It is well known in the medical community that abstaining from high glycemic index food leads to a correction of metabolic problems arising from the consumption of high glycemic foods. This correction will result in a gradual weight loss of 0.5–1 kilo gram/week, and a decrease in cholesterol and TriGlyceride levels. Furthermore, an improvement in diabetes mellitus will be evident.

Another reason for high cholesterol is the high consumption of saturated animal fat. New studies have established the need for a balance between different fat in the daily food intake. The preferred ratio is one third of fat from animal source, (i.e., butter, margarine, cheese, egg and fatty meat) one third from monounsaturated fat (i.e., olive oil), and another third from polyunsaturated fat, available in many vegetable oils. This high ratio of three essential fatty acids has a very potent effect on reducing bad cholesterol.

BioSystem™ products are high in dietary fibers which are a prophylactic in the elevation of bad cholesterol. Furthermore, foods with a high content of dietary fibers have a well established effect in the prevention of colon diseases and cancer.

BioSystem™ products treat the underlying cause of obesity and provide a permanent solution to weight loss. For diabetics this reduction in body weight causes insulin activity on the cell wall to be improved, thereby decreasing or even removing resistance to insulin. High glycemic index foods cause more insulin secretion and more carbohydrates to be stored inside body cells. These carbohydrates are converted to fat in the cell causing a resistance to insulin on the cell wall. This resistance produces a need for a higher level of production and secretion of insulin. Consequently, this decrease in blood sugar produces a hunger feeling. Furthermore, the accumulation of fat inside the cell increases complications of diabetes like diabetic neuropathy and arteriosclerosis.

The BioSystem™ method also alleviates the problem of high blood TriGlycerides and cholesterol by providing a natural balance between different types of fat, animal and vegetable. This is achieved by providing the body a balancing or correcting dose of essential unsaturated fatty acids.

The new method of dieting described herein has also solved many of the practical problems encountered in old methods of dieting.

1. The amount of food intake is unlimited. It is determined by the satiating feeling of the dieter. There are no disturbing hunger feelings, and there is no need for appetite suppressant medicines or Gastroplasty (surgical operation on the stomach to reduce its capacity for food).

2. The quantity of food is totally balanced. No naturally available food items are forbidden. The food items that are not permitted belong to artificially manufactured and modified food groups. The dieter will no longer face malnutrition, lack of a certain nutrient, protein deficiency, fat soluble vitamin deficiency, electrolyte disturbances, essential fatty acid deficiency, or free radical formation.

3. The unlimited quantity and quality of food allowed assures no economy in energy metabolism. The metabolic cause for the economy of energy consumption in the body lies in the deficiency of important nutrients such as essential fatty acids, vitamins, minerals for coenzymes, and very low caloric intake 4. Applying the BioSystem™ method is simplistic. The daily routine of the user will remain intact. There are no rigid diet prescriptions and no need for complicated calorie counting.

5. Dieters will maintain their weight loss. After reaching their goal weight, it is optional for the user to choose one of two methods of maintenance.

a. Adhere to the dieting method described herein for an unlimited period of time. Forbidden food items can be consumed on an intermittent basis (i.e., 2–3 times per week).
b. the user can go back to the food items manufactured according to the old way of manufacturing. If his/her weight starts to increase again he/she can wait until the total increase reaches 3–4 Kg, then restart the BioSystem™ diet method. The BioSystem™ method will remain very effective at any time of repetition, while the old methods face the problem of tolerance, plateau, and Yo-Yo syndrome.

6. Dieters suffering from high blood cholesterol and TriGlycerides can benefit from the unlimited amount of oils intake permitted in the new method. They will be able to increase the amount of oils they take in with no fear of gaining weight. This intake provides a rapid, safe reduction in cholesterol and TriGlyceride levels, which was impossible in the old methods of dieting. Old methods rely on drugs with the potential for hazardous side effects.

7. Fiber rich BioSystem™ products provide fewer incidences of indigestion and colon disturbances, and can play a protective roll for preventing colon cancer relating to low dietary fiber content in food.

Furthermore, the BioSystem™ food products described herein work on slowing the carbohydrate absorption rate; so as to achieve an effective absorption delay. This is accomplished by reducing the total carbohydrate weight percentage to other meal components. The BioSystem™ bread is supposed to be consumed together with other permitted food items of the meal so it should be consumed with one or more of the following categories:

1.—Milk product, egg, meat product, (proteins)
2.—oils, fat olives, margarine, cream, butter, mayonnaise (fat)
3.—salad, soup, row vegetables or pulses (vegetable carbohydrates)
4.—fruit (carbohydrate)
5.—cooked vegetables, cooked pulses, with meat and fat (mixed vegetable carbohydrate protein and fat)
6.—cookies, sweets, marmalade, chocolate (they should be BioSystem™ type only)

in categories 1 and 2 adding BioSystem™ bread will result in very low carbohydrate percentage, so the expected carbohydrate absorption will be extremely low.

in categories 3 and 4 all food items are carbohydrates. When adding BioSystem™ bread, the weight percentage will decline sharply, taking in to consideration that fruits and vegetables have a very high percentage of their weight as water. The end result is that carbohydrates will form no more than about 30% of the meals dry weight. If we consider the high content of fiber and protein in BioSystem™ bread, the carbohydrates will suffer even more delay in absorption. This leads to an expected glycemic index of no more than about 15%, and accordingly the carbohydrate absorption will suffer a very marked time delay.

Other ingredients may be included in the formulation of the present invention in the production of said invention. These additives would perform their normal function and would be required for the production of the variety of food items disclosed herein.

FURTHER SCIENTIFIC EXPLANATION FOR THE RESULTS OBTAINED

The following scientific notions and data are well accepted:

1. In the case that the food intake is sufficient in quantity and quality, i.e. rich in fat, especially the mono and poly unsaturated essential fatty acids, as well as minerals, vitamins and protein, the energy consumption in the body doesn't decline.
2. A decreased blood cholesterol level occurs with a diet low in animal fat and high in vegetable fat, especially mono and poly unsaturated essential fatty acids, and high in fiber content.
3. A dramatic improvement in Diabetes mellitus type II occurs in over weight and obese patients who reach their body normal weight.
4. The dramatic improvement in Diabetes mellitus type II is evident in a very low glycemic index diet. In this case all food items that have high carbohydrate absorption value are replaced by other food items that have very low carbohydrate absorption ratios.
5. The improvement of the general condition of the body, and the dramatic improvement of hypertension in patients suffering from hypertension accompanied by obesity and high blood lipid levels is evident for patients dieting on high fiber, high mono and poly unsaturated fat foods.
6. Lack of hunger, fatigue, malnutrition or psychological stress is evident for dieters eating sufficient food in quality and quantity, rich in essential fatty acids, rich in good protein, sufficient in vitamins and minerals, and sufficient in most food varieties, flavors and textures.

Reduction in Food Caloric Value:

It is well established that:

Fat is burned in the body to produce 9 calories/1 gram
Protein is burned in the body to produce 4 calories/1 gram
Carbohydrates are burned in the body to produce 4 calories/1 gram.

Although this is widely accepted, there are several additional conditions that must be fulfilled so as to obtain caloric out put.

Here are some of these conditions:

1. Fat production is 9 calories/gram in the case when fat is burned to the end of the burning process, so as to produce CO2 and H2O. This will happen if the following two conditions are fulfilled at the same time:
   when sufficient amounts of carbohydrates are available in the same LOCATION where the fat is burned, and
   when sufficient amounts of carbohydrates are available at the TIME when fat is burned.

If these two conditions are not fulfilled, fat will not be burned to the end of the burning reaction. Fat will be burned by keton bodies that are acetone, acetic acid and gama butyric acetic acid. These products are not at the end of the burning process. They can be burned, and can produce calories so as to reach the end of the burning reaction that is CO2 and H2O. The energy produced by burning 1 gram of fat to form keton bodies is estimated by 2.8 calories/gram and not 9 calories. The keton bodies products are secreted through the kidneys, secreted through acetone odor through breathing, or metabolized in other metabolic pathways. In the Type I Diabetes mellitus disease, there is a deficiency in insulin needed for the carbohydrate to enter the cell and Ketosis, that is burning fat to form keton bodies, takes place. This causes patients to continue to lose weight in spite of high caloric food intake. To simulate this process in non-diseased persons, patients are administered normal caloric intake, which results in weight loss. To achieve this we need to:

make insulin secretion minimal and make carbohydrates available in the cell minimal, at the time that fat and protein are burned.

2. Proteins are classified in two catagories:

Glycogenic Amino Acids: These amino acids can be metabolized to form pyruvate and glucose and can be used as a source of carbohydrates for energy production.

Non Glycogenic, or Ketogenic Amino acids: These amino acids cannot be used to produce pyruvate and glucose. If we need to burn these amino acids to produce energy in the body, we should have a source of carbohydrates to be burned to $CO_2$ and $H_2O$. If no carbohydrate source is available in the site where these amino acids are burned they will burn to produce keton bodies, hence the name ketogenic amino acids. It is estimated that 10% of protein weight is composed of glycogenic amino acids and 90% of ketogenic amino acids. Of course, this depends upon the type of amino acids available in the protein discussed.

3. Carbohydrates are always burned to produce 4 calories/gram to end as $CO_2$ and $H_2O$.

The Carbohydrates Needed In The Site of Fat and Protein Burning:

1. Carbohydrates in food: The body processes carbohydrates in food after absorption by use of insulin entered inside the cells, where it is used as fuel and burned to end as $CO_2$ and $H_2O$. The extra carbohydrate absorbed beyond energy production requirements are converted to Triglycerides and stored as fat. Only the following carbohydrates are retained in body cells:

In the Liver: carbohydrates are stored as Glycogen. The body keeps a reserve of only 120–480 grams of glycogen storage in the liver.

In Muscles: carbohydrates are stored as small amounts of glycogen estimated to be less than 50 grams In Blood: carbohydrates are stored as glucose in the ratio of 100 mg/100 ml blood or 5 grams/5 liters blood.

2. Carbohydrates induced through other metabolic pathways:

The carbohydrate source can be the pyruvate from glycogenic amino acids available in the protein from food or from the digestion of self protein in a 0 calorie diet or from glycerol resulting from hydration of triglycerides absorbed in the intestines.

The body uses carbohydrates available in the blood and muscles first. After they are used up it starts to liberate glucose from liver glycogen. If it is not available, because either it is used up or not accessible because of certain hormonal and humeral conditions it will start using fat and protein sources as a source of energy. The body starts to use fat coming from food first, then the protein coming with food. If this source is not enough, the body will start to use the fat stored in the cells. If this is not enough, or not accessible because of some humeral and hormonal conditions, the body starts to use self protein as a source of energy.

The Slowed Carbohydrate Absorption Rate and the Sequences of Time Delay in Reaching the Site of Fat and Protein Burning:

1. Burning food with less caloric output value

A slowed carbohydrate absorption rate leads to the consumption of glucose available in blood and muscles. Next an organism starts to liberate glycogen from the liver. Glycogen is then released from the liver due to several hormonal responses, like high catecholamin function, low corticosteroid function, and local alimentary tract hormone secretion, etc. High protein and fat content of meal favor less glucacon secretion, and less glycogenolysis. A small part of fat and protein absorbed from meals find enough carbohydrates in the site of burning for a complete burning reaction. The percentage of fat and protein that can complete the burning process to end with $CO_2$ and $H_2O$ depends upon many factors including:

1. the speed of carbohydrate absorption in the meal (Glycemic Index). High absorption speed favors a higher percentage of fat and protein that end the burning reaction to $CO_2$ and $H_2O$. The speed of absorption (Glycemic Index) depends on the weight percentage of carbohydrate relating to total meal weight and the type of carbohydrate in the meal. Absorption is very fast in mono and Di saccharids, intermediate in polysaccharides, slow in amylose, very slow in amylopectin, no absorption and hindering to absorption in water soluble fibers, and no absorption and fastened alimentary transit in water non soluble fibers. The speed of absorption also depends on the intestinal transit time of food, electrolyte balance in the intestine, and the water content and osmolity of intestinal content.

2. the hormonal status of the organism:

Corticosteroids, sex hormones, anabolics, relaxation, and sedentary life style all favor more fat and protein that ends to $CO_2$ and $H_2O$.

Thyroid hormones, catecholamines, psychological and physical stress, tumors, and feverish diseases all favor less fat and protein that end the burning reaction to $CO_2$ and $H_2O$.

3. medicines and external factors:

It is known that some drugs cause weight gain. One possible explanation is that they interfere with the speed of carbohydrate absorption or with the hormonal circuits relating to fat and protein burning.

Decrease the Esterfication Rate of Fatty Acids Coming With Food to Triglycerides in the Cell It is known that lipids are digested in the intestine to free fatty acids and glycerol. After being absorbed to the circulation, the fatty acids enter the cells, with the aid of several hormonal and humeral mediators. Inside the cell the fatty acids are being esterfied to triglyceride and stored. An important metabolic point is that the glycerol that is liberated from hydrolysis of lipids in the intestine is not the same that is used in reesterfication of free fatty acids in the cell to triglycerides. The glycerol resulting from fat digestion and hydrolysis is used for energy production but not for re-esterfication of free acids in the cell. The glycerol used in esterfication of free fatty acids absorbed to the cell should come from locally available glucose. If there is a delay in having glucose in the site needed for esterfication, the free fatty acid will not be stored and stays ready for use as fuel. The acid will not be stored and is burned with very low caloric output.

Decrease Insulin Secretion From the Pancreas

The very slowed carbohydrate absorption speed, leads to a very small effect on insulin secretion from the pancreas. If this process continues for several days or weeks, the insulin level will decline continuously until it reaches a minimum, causing the following metabolic outcomes:

1. A decrease in glucose transit from the blood into the cells, causing a burning of fat and protein with less caloric output and a decrease in carbohydrates that enter the cells. Which favor less probability to be converted to fat and stored.
2. A decrease in free fatty acids that transit from the blood into the cells, causing a decrease in the process of lipogenesis inside the cell and an increase in the process of lipolysis inside the cell. Both 1 and 2 above favor the liberation of fat from its storage inside the cell and make fat easy and ready to be used as fuel to be burned.
3. An increase in the insulin efficacy and cure from insulin resistance. The liberation of fat from its storage inside the cell, and the reduction of fat percentage to cell volume, decrease the resistance to insulin known in the adult type diabetes. The resistance to insulin in Type II Diabetes occurs because the more sugar being absorbed evokes more insulin secretion from the pancreas. The result is that all sugar in food enters the cell and a small part is burned. The other part is stored as fat and if the fat stored in the cell reaches 25% of cell volume, the cell starts to resist any more sugar and fat entering the cell. If still more sugar is absorbed and available in the blood the surplus should be oriented somewhere, but because the cell refuses the surplus, the organism has to force the cell to accept this surplus glucose by instructing the pancreas to secrete more insulin. Under a higher dose of insulin the cell is forced to accept a new delivery of glucose and fat, which in turn is stored. The cell then refuses to accept any new delivery of glucose and the sugar increases outside the cell (i.e. in the blood). The organism has to order the pancreas to secrete even a higher dose of insulin to force the cell to accept this new delivery of glucose. As a result the insulin level increases but its effect is the same as it was when the cell's content of fat was less than 25%. It is obvious that decreasing the fat volume inside the cell will automatically lead to improved insulin efficacy. Although the insulin level will go down its efficacy returns to normal and the end result is a dramatic improvement in all diabetes symptoms.

Blood sugar will decrease and the need for oral anti diabetic drugs will be reduced because there is no longer a need for higher insulin levels and increased insulin secretion. The signs and symptoms relating to diabetic athero sclerosis will improve, for example, diabetic neuropathy, diabetic atherosclerosis, and arthritis. This occurs because the fat accumulated inside the arterioles that becomes occluded or stenosed is now evacuated and burned. That leads to better blood flow in the arterioles and provides a cure or improvement in neuropathy and arteritis.

A Decrease in Low Density Lipoprotein Cholesterol Fraction and an Increase in High Density Lipoprotein Fraction:

It is known that high insulin levels have a direct casual relationship to high blood pressure and high levels of low density lipoprotein cholesterol fraction, as well as low levels of high density lipoprotein fraction.

It is therefore expected that decreasing insulin levels will lead to dramatic improvement in hypertension and cholesterol.

Increase the Possibility for the Pancreas to Restore Better Function

The less need for insulin secretion for prolonged periods will give the pancreas a chance for self regeneration. This process contrasts the exhausting and destroying mechanism of giving oral anti diabetic drugs. These drugs force the pancreas to secrete more and more until reaching the limit that to some degree is a non functioning gland similar to that of juvenile insulin dependent diabetes. In this complicated case, the BioSystem™ diet method will not be effective any more.

How BioSystem™ Bread and Products Work on Slowing Carbohydrate Absorption Rate, so as to Get the Effective Absorption Delay:

BioSystem™ Bread is to be consumed together with other permitted food items. It should be consumed with one or more of the following categories:
1. Milk product, egg, meat product, (proteins)
2. Oils, fat, olives, margarine, cream, butter, mayonnaise (fat)
3. Salad, soup, row vegetables or pulses (vegetable carbohydrates)
4. Fruit (carbohydrate)
5. Cooked vegetables, cooked pulses, with meat and fat (mixed vegetable carbohydrate protein and fat)
6. cookies, sweets, marmalade, chocolate (they should be BioSystem™ type only)
   in categories 1 and 2, adding BioSystem™ Bread will result in very low carbohydrate percentage, so the expected carbohydrate absorption will be extremely low, with expected glycemic index of less than 5%
   in categories 3 and 4, all food items are carbohydrates, with a glycemic index range from 10–60%. When adding BioSystem™ Bread, the weight percentage will decline sharply, taking into consideration that fruits and vegetables have a very high percentage of their weight as water. The end result is that carbohydrates will form no more than 30% of the meal dry weight. If we consider the high content of fiber and protein in BioSystem™ Bread, the carbohydrates will suffer even more delay in absorption. This leads to an expected glycemic index of no more than 15%, and accordingly the carbohydrate absorption will suffer a very marked time delay, sufficient for producing the expected effect.
   in categories 5 and 6, a glycemic index of 10% and lower carbohydrate absorption speed is achieved.

The Unique Composition of BioSystem™ Bread and Products

If we consider the high content of fiber and protein in BioSystem™ Bread, the carbohydrate level will suffer even more delay in absorption. This leads to an expected glycemic index of no more than 15%. The carbohydrate absorption suffers a very marked time delay, sufficient for producing the expected effect. The end result is that adding BioSystem™ Products as a substitution to similar food products manufactured according to classical ways causes a marked delay in carbohydrate absorption leading to the results described herein.

How BioSystem™ Bread and Products Work on Improving High Cholesterol Conditions:

BioSystem™ products slow the carbohydrate absorption speed by decreasing insulin level, decreasing lipogenesis from carbohydrates, and increasing lipolysis. BioSystem™ products increase the ratio of unsaturated fatty acids to saturated fatty acids in meals. It is established that the unsaturated fatty acids should form no less than two thirds of total daily ingested fat. In such cases it is usually expected to have cholesterol, especially bad cholesterol, at its minimal level. If the percentage of unsaturated fat becomes more than the two thirds, a marked improvement in cholesterol level will occur. The additional 30–40 grams of unsaturated fatty acids will shift the equilibrium far beyond the needed ratio to have a cholesterol lowering effect. BioSystem™ products contain a high fiber content. It is well established that water soluble fiber hinders the absorption of external cholesterol in food. Two to three loaves of BioSystem™ Bread will provide 8–12 grams of fiber. Adding this to the normal fiber intake will raise ones daily fiber intake to about 18–26 grams/day, assuming the average normal intake is about 8–14 grams/day, and a prophylactic effect on external cholesterol absorption and colon cancer will be realized.

How BioSystem™ Bread and Products Work on Limiting Daily Caloric Intake to Normal Figures:

BioSystem™ products have a high fiber content which is known to be a very potent satiety factor. The products absorb a large amount of liquids resulting in a fullness effect. High fat and protein in meals is known to be a very potent satiety factor. Also, the ketosis and keton bodies formation realized is known to have a marked satiating effect on the satiety brain centers. By decreasing insulin levels with BioSystem™ products food ingestion in Type II Diabetes and heredity obesity is reduced. High insulin levels are very potent appetite enhancing factors and after controlling high insulin levels by the methods and products mentioned in this paper, appetites can be controlled. Furthermore, different food metabolites in the BioSystem™ diet are known to a have satiating effect on the brain centers. These include free fatty acids, protein metabolites, etc. All of the above factors contribute to a normal satiety feeling which help prevent overeating and exaggerated caloric intake. In most cases, people under this new method of dieting eat no more than 20–30 calories/kg of present body weight. This amount of caloric intake in the BioSystem™ diet will produce about 30–40% less caloric output than expected. The 100 Kg person will eat 2000–3000 calories/day. The BioSystem™ diet causes calories to be burned at a rate of 1400–1800 calories/day. This will result in a weight loss of 1–1.25 kg/week. After losing 15 kg, the dieter still eats 2000–3000 calories/day, but his need will be decreased to 2400 calories/day, while the real output of the food eaten is still 1400–1800 calories. This will produce a weekly weight loss of 0.8 kg/week.

When the dieter reaches his/her normal weight range and his/her weight becomes 70–75 kg, their need for caloric intake will decline to only 2000–2200 calories/day, and the caloric yield according to BioSystem™ method will be 1400–1800 calories/week. The net weekly weight loss will decline to 200–300 grams/week. When an ideal weight of 67 kg is achieved, the need for caloric intake will decline to 1800 calories, and the caloric output yielded according to the BioSystem™ diet will be the same. This means that BioSystem™ dieters will not have any weight loss beyond their ideal weight, unless they reduce the caloric intake which can be achieved through omitting fat from food. This type of diet is a mixed diet that can be used for small intervals of time, (two weeks) for some dieters to speed up the weight loss process and is an Intensive application of the BioSystem™ diet.

While certain specific embodiments of the invention have been described with particularity herein, it should be recognized that various modifications thereof will occur to those skilled in the art. Therefore, the scope of the invention is to be limited solely by the scope of the claims appended hereto.

I claim:

1. A bread weight loss composition comprising complex carbohydrates, vegetable protein, vegetable fat, and dietary fibers, said composition containing from about 8% to about 18% of dry weight of said complex carbohydrates, wherein said complex carbohydrates comprise at least about 90% of said carbohydrates selected from the group consisting of amylopectin and amylose, up to about 5% of said carbohydrates selected from the group consisting of disaccharides and polysaccharides, and up to about 5% of said carbohydrates are monosaccharides, from about 43% or greater of dry weight of said vegetable protein, wherein said vegetable protein is of a high biological value, said vegetable protein being selected from the group consisting of soybean, peanut, lupine, wheat and yeast, from about 14% to about 25% of dry weight of said vegetable fat, wherein said vegetable fat comprises about 15% saturated fat, about 40% to about 45% of monounsaturated fat and about 40% to about 45% of polyunsaturated fat, wherein said monounsaturated fat is oleic acid, and said polyunsaturated fat comprises linoleic, linolic, and arachidonic acids, and from about 4.8% to about 6.2% of dry weight of said dietary fibers, wherein said dietary fibers comprise greater than about 65% water soluble fibers and less than about 35% water insoluble fibers, said weight loss composition having a glycemic index between about 5% and about 15%.

2. The weight loss composition according to claim 1 further including wheat flour, baking yeast, water, minerals and vitamins.

3. A bread product formed by processing and baking the composition of claim 2.

4. A bread weight loss composition consisting essentially of complex carbohydrates, vegetable protein, vegetable fat, and dietary fibers, said composition containing from about 8% to about 18% of dry weight of said complex carbohydrates, wherein said complex carbohydrates comprise at least about 90% of said carbohydrates selected from the group consisting of amylopectin and amylose, up to about 5% of said carbohydrates selected from the group consisting of disaccharides and polysaccharides, and up to about 5% of said carbohydrates are monosaccharides, from about 43% or greater of dry weight of said vegetable protein, wherein said vegetable protein is of a high biological value, said vegetable protein being selected from the group consisting of soybean, peanut, lupine, wheat and yeast, from about 14% to about 25% of dry weight of said vegetable fat, wherein said vegetable fat comprises about 15% saturated fat, about 40% to about 45% of monounsaturated fat and about 40% to about 45% of polyunsaturated fat, wherein said monounsaturated fat is oleic acid, and said polyunsaturated fat comprises linoleic, linolic, and arachidonic acids, and from about 4.8% to about 6.2% of dry weight of said dietary fibers, wherein said dietary fibers comprise greater than about 65% water soluble fibers and less than about 35% water insoluble fibers, said weight loss composition having a glycemic index between about 5% and about 15%.

5. The weight loss composition according to claim 4 further including wheat flour, baking yeast, water, minerals and vitamins.

6. A bread product formed by processing and baking the composition of claim 5.

* * * * *